United States Patent [19]
Engel

[11] 3,907,408
[45] Sept. 23, 1975

[54] CASSEGRAINIAN MIRROR ARRANGEMENT FOR LASERS

[75] Inventor: Simon L. Engel, Peoria, Ill.

[73] Assignee: Caterpillar Tractor Company, Peoria, Ill.

[22] Filed: Aug. 20, 1973

[21] Appl. No.: 389,691

[52] U.S. Cl. ................. 350/294; 350/288; 350/293
[51] Int. Cl.² ........................................... G02B 5/10
[58] Field of Search .......................... 350/288–310, 350/255, 199–201, 55, 202; 219/121 L

[56] References Cited
UNITED STATES PATENTS

| | | | |
|---|---|---|---|
| 2,703,506 | 3/1955 | Kelly | 350/294 |
| 3,049,054 | 8/1962 | Waland | 350/255 |
| 3,142,235 | 7/1964 | Siegmund | 350/200 |
| 3,244,885 | 4/1966 | McHenry | 350/294 |
| 3,411,852 | 11/1968 | Marinozzi | 350/294 |
| 3,535,042 | 10/1970 | Stites et al. | 350/294 |
| 3,681,709 | 8/1972 | Brown | 331/94.5 C |
| 3,797,908 | 3/1974 | Ward | 350/294 |

Primary Examiner—Alfred E. Smith
Assistant Examiner—Michael J. Tokar
Attorney, Agent, or Firm—Phillips, Moore, Weissenberger Lempio & Strabala

[57] ABSTRACT

A reflective optical system includes a flat mirror having a centrally disposed opening, and being obliquely mounted relative to an annular collimated supply beam of electromagnetic energy such as provided by a laser, an annular concave mirror to which the beam is reflected from the flat mirror, and a circular convex mirror mounted in the opening defined by the flat mirror, to which the beam is reflected from the concave mirror, the beam then being reflected from the convex mirror and passing through a central opening in the concave mirror.

1 Claim, 5 Drawing Figures

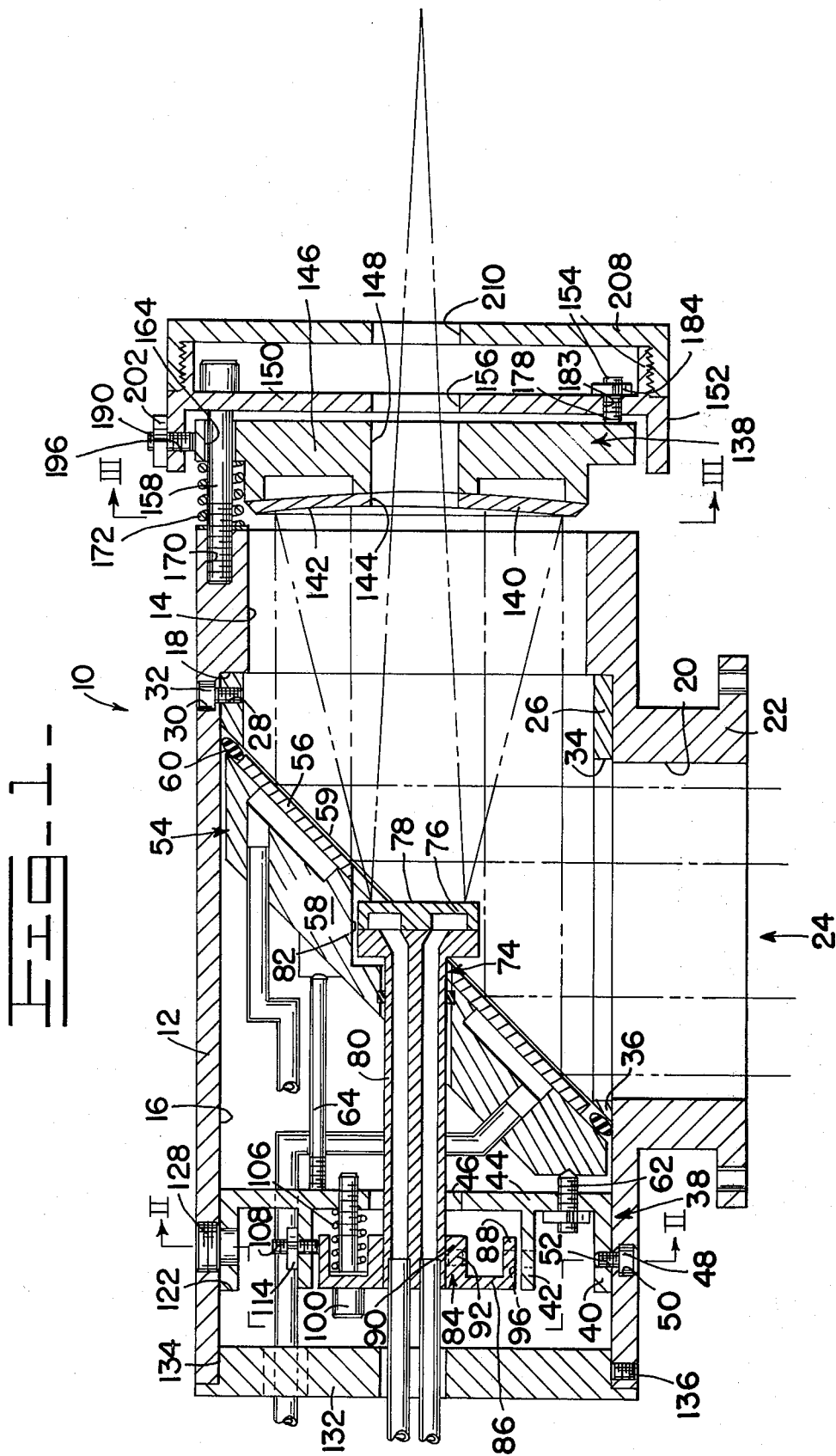

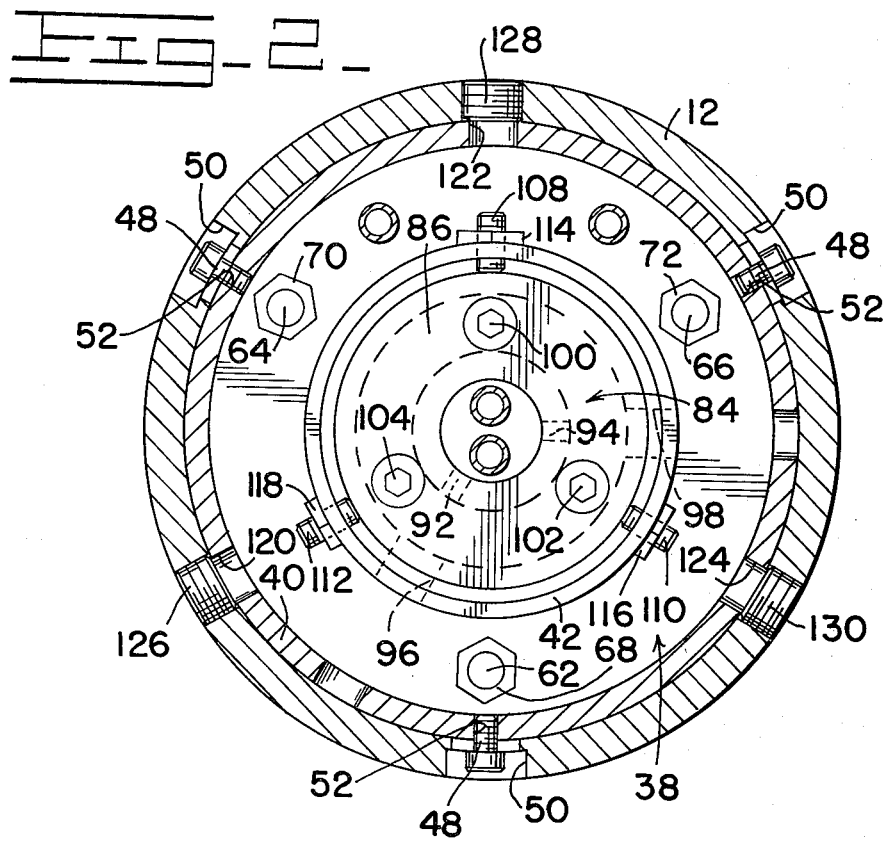
FIG-2-
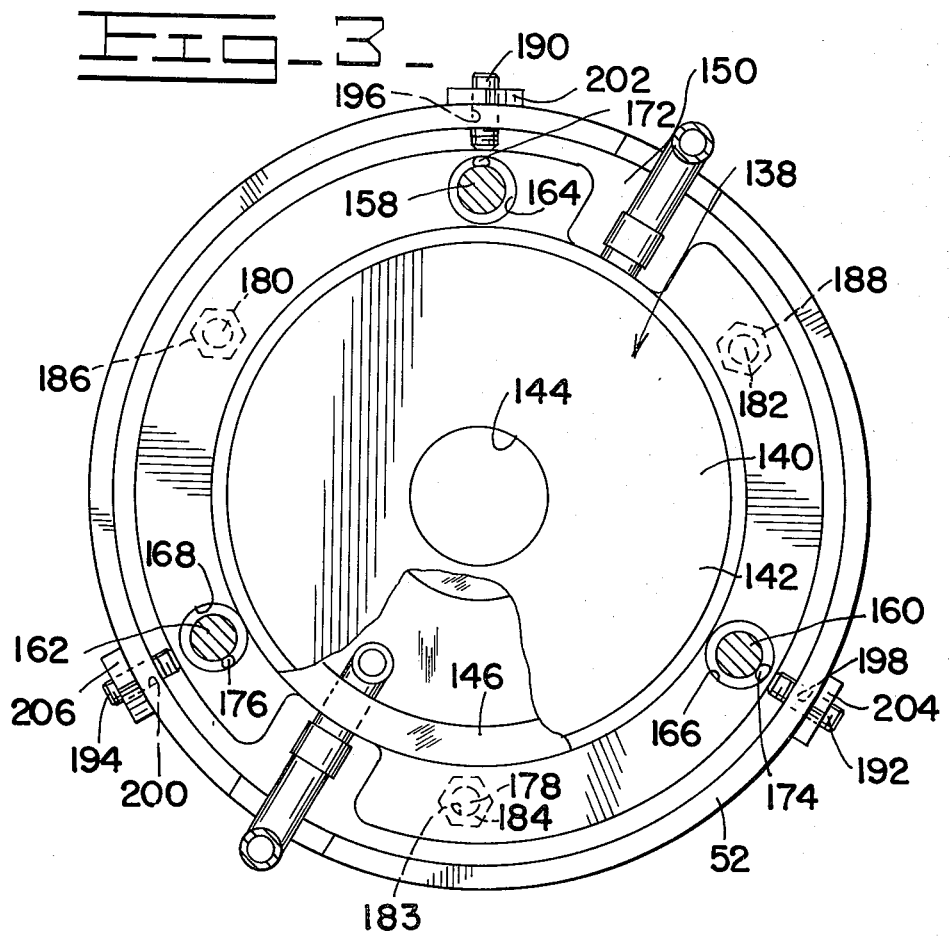
FIG-3-

CASSEGRAINIAN MIRROR ARRANGEMENT FOR LASERS

BACKGROUND OF THE INVENTION

This invention relates to lasers, and more particularly to a mirror system for controlling a supply laser beam.

The practical commercial usage of lasers in general industrial applications is dependent upon the development of dependable, economic laser sources of sufficient power, and manageable optical systems to focus and control the laser supply beam. Recent advances in the art provide lasers suitable for heavy-duty industrial applications. The present invention is therefore directed to providing a compact, easily manageable mirror system to condition and direct a beam of electromagnetic energy from such a laser to a workpiece.

It will be understood that such a mirror system should with advantage afford an obstruction-free path for the electromagnetic energy beam, thereby eliminating losses due to obstructions presented by mirror support structures, in present systems. It will also be understood that the mirror system should with advantage be easily adjustable and/or convertible so as to be adaptable to a variety of conditions.

Of general interest in this area is U.S. Pat. No. 3,681,709 to Brown.

SUMMARY OF THE INVENTION

It is an object of this invention to provide a mirror system that affords an obstruction-free path for an electromagnetic energy beam.

It is a further object of this invention to provide a mirror system which, while fulfilling the above object, is adjustable in a convenient manner so as to avoid the limitations inherent in a fixed mirror system.

It is a still further object of this invention to provide a mirror system which, while fulfilling the above objects, allows for the easy replacement of focusing means to readily convert the mirror system for use in applications requiring a change in the convergence of the electromagnetic energy beam.

Broadly stated, the invention comprises a mirror system for controlling a supply laser beam. Such mirror system comprises a first mirror having a reflective surface and positioned to reflect the supply laser beam therefrom, a second mirror having a reflective surface and positioned to reflect the laser beam reflected from the reflective surface of the first mirror, and a third mirror having a reflective surface positioned to convergingly reflect the laser beam reflected from the reflective surface of the second mirror.

BRIEF DESCRIPTION OF THE DRAWINGS

These and other objects of the invention will become apparent from a study of the following specification and drawings, in which:

FIG. 1 is a sectional elevational view of the inventive mirror system;

FIG. 2 is a sectional view taken along the line II—II of FIG. 1;

FIG. 3 is a view partially broken away, taken along the line III—III of FIG. 1;

DESCRIPTION OF THE PREFERRED EMBODIMENT

Figure 4:
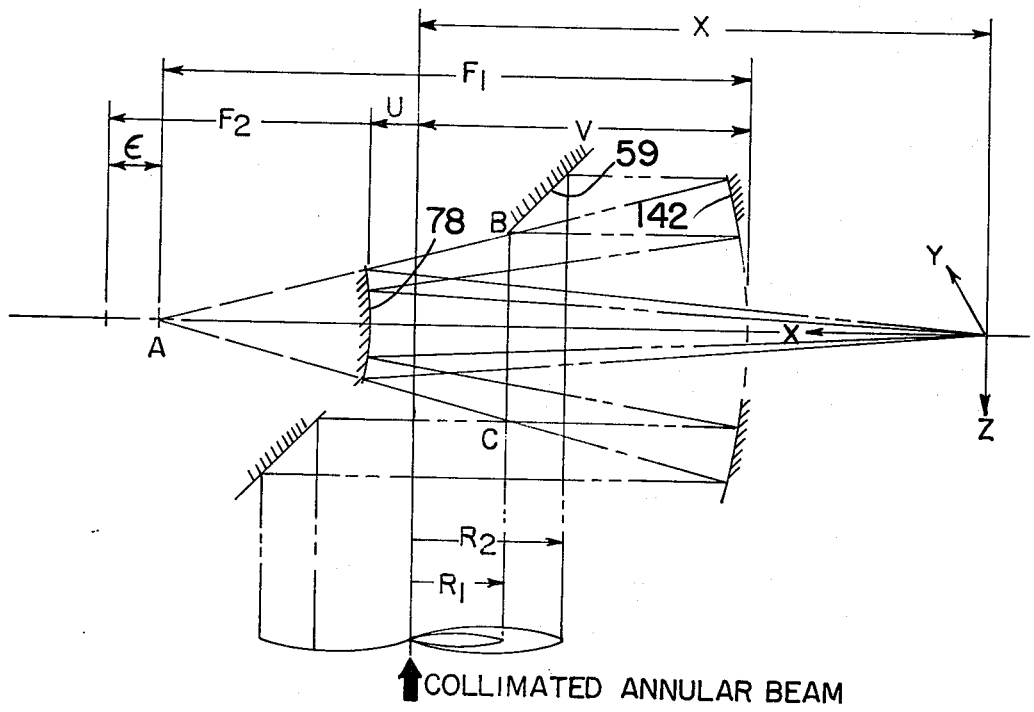
FIG. 4 is a schematic illustration in the x-z plane of the mirror system in accordance with the present invention.

In FIG. 1, a mirror system shown in section and incorporating the principles of the present invention is generally indicated by the reference numeral 10. The mirror system 10 includes a generally cylindrical main support body 12 having a bore 14 and a counterbore 16 defining a radially extending shoulder 18. A circular opening 20 is formed in the wall of support body 12 and is joined to a mounting flange 22 forming a supply laser beam entry port 24. A sleeve member 26 has an outer diameter slightly smaller than the diameter of the counterbore 16 to permit the sleeve member 26 to be positioned concentrically in the center and axially positioned on the shoulder 18. A threaded hole 28, formed in the sleeve member 26, is radially positioned to mate with a counterbore hole 30 in the support body 12. The sleeve member 26 and support body 12 are joined in fixed relationship by a cap screw 32. A circular opening 34 is formed in the sleeve member 26 adjacent the circular opening 20 formed in the support body 12 and in alignment with the beam entry port 24. The sleeve member 26 has a sloped end 36 which is inclined at a 45° angle with respect to the axis of the sleeve member 26.

A mirror adjusting ring 38 has a radially disposed outer flange 40 and a concentrically disposed inner flange 42, both flanges extending rearwardly from a face portion 44 of the ring 38, the face portion 44 having a centrally disposed bore 46 formed therein. As shown in FIGS. 1 and 2, the adjustsing ring 38 is joined in fixed relation to the support body 12 by a plurality of cap screws 48 extending through slotted openings 50 in the support body 12 and engaging threaded holes 52 provided in the ring 38.

A flat mirror assembly, as generally indicated by the reference numeral 54, is interposed the sloped end 36 of the sleeve member 26 and the mirror adjusting ring 38. The mirror assembly 54 includes a plate 56 joined by epoxy, welding, brazing or similar means to a base member 58. The plate 56 has an elliptically shaped, flat reflective surface 59. The flat mirror assembly 54 is positioned against an O-ring 60, interposed the base member 58 and the sloped end of the sleeve member 26 by adjusting screws 62,64 shown in FIGS. 1 and 2 and 66 in FIG. 2 only. The adjusting screws 62,64,66 engage threaded holes provided in the face portion 44 of the adjusting ring 38 and are locked in place by lock nuts 68,70,72. The O-ring 60 serves to resiliently bias the mirror assembly 54 against the adjusting screws 62,64,66, thereby permitting fine adjustment of the mirror assembly 54 by appropriate lengthening or shortening of the adjusting screws 62,64,66.

A spherical mirror assembly, as generally indicated by the reference numeral 74, inlcudes a face member 76 having a circular, spherically convex reflective suurface 78, and a support stem 80 joined to the face member 76 by one of the aforementioned methods. The spherical mirror assembly 74 extends through a centrally disposed opening 82 provided in the flat mirror assembly 54 and the axial bore 46 provided in the mirror adjusting ring 38, so that the reflective surface 78 is generally adjacent the center of the reflective surface 59. The assembly 74 is mounted in a support ring 84. The support ring 84 includes a radially disposed wall 86 extending between an axially directed circular outer flange 88 and a concentrically positioned circular inner flange 90. The inside diameter of the inner flange 90 is substantially equal to the outer diameter of the support stem 80, thereby providing a generally rigid connection between the support ring 84 and stem 80. The ring 84 and stem 80 are axially fixed relative to each other by a pair of set screws 92,94 which are accessible through a pair of aligned openings 96,98 respectively, as shown by phantom lines in the outer flange 88 of the support ring 84 and the inner flange 42 and the outer flanges 40 of the adjusting ring 38.

The support ring 84, and the spherical mirror assembly 74 mounted therein, are axially and angularly jointly positioned by adjusting screws 100,102,104. The screws 100,102,104 are mounted through the radially disposed wall 86 of the ring 84 and are threaded into holes provided therefor in the face portion 44 of the mirror adjusting ring 38. Springs 106, coaxially mounted on the adjusting screws 100,102,104, are positioned to opposedly bias the wall 86 and face portion 44. Radial adjustment of the support ring 84 and mirror assembly 74 is provided by slot headed adjusting screws 108,110,112, threaded through tapped holes equidistantly spaced about the inner flange 42. After adjustment, the screws 108,110,112 are locked in position by lock nuts 114,116,118 respectively. Access to the adjusting screws 108,110,112 is provided by openings 120,122,124 formed in outer flange 40 of the mirror adjusting ring 38 and the counterbore 16 of the support body 12 in radial alignment with the screws 108,110,112. The portion of the access openings formed in the support body 12 is threaded to receive protective screw plugs 126,128,130.

A circular end plate 132, having a stepped portion 134 slidably positioned in the counterbore 16, is secured in place by a setscrew 136.

An annular mirror assembly, as generally described by the reference numeral 138, includes a face member 140 having a circular, spherically concave reflective surface 142, and defines a centrally disposed aperture 144 through the reflective surface 142. The face member 140 is joined to a base 146 having a centrally disposed bore 148 in alignment with the aperture 144.

A circular mirror support 150 has an axially extending flange 152 and an oppositely axially extending threaded flange 154 radially disposed about the circumference and a centrally formed bore 156. The support 150 is joined to the main support body 12 by equidistantly spaced mounting screws 158,160,162 which extend through holes 164,166,168 respectively provided in the base 146 and engage tapped holes such as shown at 170. The mounting screws 158, 160, 162 respectively have springs 172, 174, 176 coaxially mounted thereon and interposed the base 146 and the main support body 12 to opposedly bias the base 146 and support body 12.

Axial and angular adjustment of the annular mirror assembly 138 is provided by slotted screws 178, 180, 182 which are threaded through tapped holes 183 respectively provided in the mirror support 150. These screws 178, 180, 182 are respectively retained in fixed adjustment by lock nuts 184, 186, 188. Similarly, slotted screws 190, 192, 194, threaded through tapped holes 196, 198, 200 in the mirror support flange 152 and locked in place by lock nuts 202, 204, 206 respectively provide radial adjustment of the annular mirror assembly 138.

A protective cover 208, having internal threads and a centrally disposed bore 210, is mounted on the threaded flange 154 of the mirror support 150.

An annular collimated supply laser beam enters through port 24, and the mirror assembly 54 is positioned so that the reflective surface 59 thereof reflects the beam therefrom in a direction 90° from the direction of travel from the supply laser beam. The mirror assembly 138 is positioned so that the reflective surface 142 thereof is positioned to convergingly reflect the beam reflected from the reflective surface 59. The mirror assembly 74 is positioned so that the reflective surface 78 thereof is positioned to convergingly reflect the beam reflected from the reflective surface 142, such beam passing through the aperture 144 and bore 148.

It will be seen that means are included for adjusting each mirror assembly relative to the other mirror assemblies to vary the control and focus of the beam by the system 10.

Figure 5:
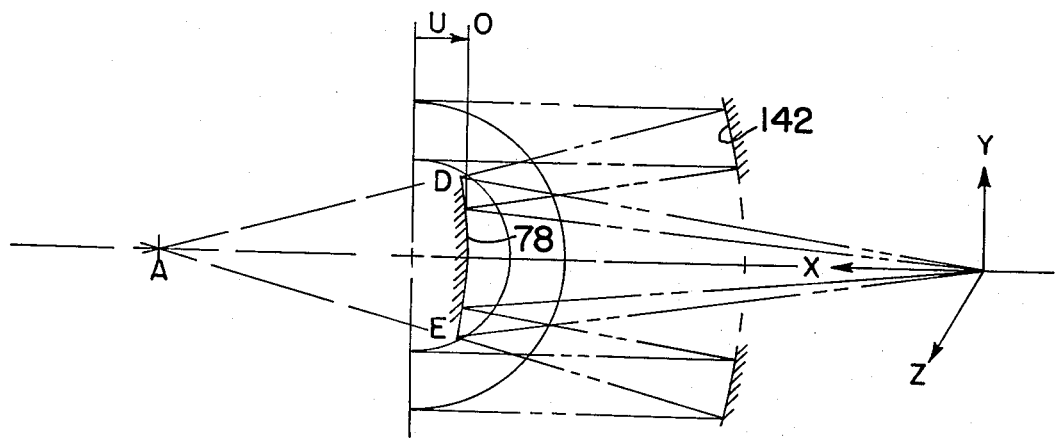
FIG. 5 is a schematic illustration in the x-y plane of the mirror system of FIG. 4.

Reference is made to FIGS. 4 and 5 to be studied with the following mathematically analysis of the mirror system 10.

Using the thin lens formula applied to mirrors:

$$\frac{1}{X+V} = \frac{1}{F_1-U-V} - \frac{1}{F_2}$$

from which $$X = \frac{(F_2)^2}{\epsilon} - (F_1 - V) - \epsilon$$

where the distance $\epsilon$ between the focii is
$\epsilon = (F_2-F_1) + U + V$
The axial change in position of the point of focus $(x)$, or axial magnification $M_a$, is defined as $$M_a = \frac{dx}{d\epsilon} = - \left[\frac{(f_2)^2}{\epsilon^2} + 1\right]$$

The optical boundary conditions determine that:
 X > V
(Image must be formed outside system)
and
 $\epsilon > 0$
(Image must be real)

It is useful to calculate the lateral change in position of the point of focus $(y,z)$ when the convex mirror is given a lateral displacement $(y', z')$. A small displacement of the reflective surface 78 will result in a much larger displacement of the point of focus dependent on the dimension X. The angle by which the (nonexistent) central ray is deflected is twice the angle between the optic axis and an extended radius from the center of curvature of the convex mirror surface 78. Therefore, for small angles, (i.e., $y' << F_2$, $z' << F_2$)

$$y = - \left(\frac{X+U}{F_2}\right) y' \text{ and } z = - \left(\frac{X+U}{F_2} z'\right)$$

the negative sign occurs because a lateral displacement of the convex mirror surface 78 in one direction results in a displacement of the point of focus in the opposite direction.

To determine the clearance condition of the rays in the x-z plane, assume a given set of fixed parameters $F_1, R_1, R_2$, and the variable parameter V. Then the F number of the cone A B C must be ≧ F number of the concave mirror, where by definition $$F \text{ No.} = \frac{\text{focal length}}{\text{diameter}}$$

thus $$\frac{F_1 - V + R_1}{2R_1} \geq \frac{F_1}{2R_2}$$

from which $$V \geq R_1 + F_1 \left(1 - \frac{R_1}{R_2}\right)$$

For the concave mirror to clear the incoming beam,
$V > R_2$
For the concave mirror not to focus in the surface of the convex mirror,
$V < (F_1 - U)$
Limiting dimensions for the concave mirror are outer diameter > $2R_2$ inner diameter > $\frac{X-V}{X+U} D_2$ where $D_2$, the diameter of the convex mirror, is determined below.

Limiting conditions on the position and diameter of the convex mirror on the x-y plane (Under certain conditions this mirror will block off the incoming beam):
For $U \leq O$
$D_2 \leq 2(R_1^2 - U^2)$
for a given $F_1$ F number concave mirror ≧ F number cone A D E
i.e., $$\frac{F_1}{2R_2} \geq \frac{F_1 - (V+U)}{D_2}$$

from which $$D_2 \geq \frac{2R_2}{F_1} [F_1 - (V+U)]$$

Hence, for $U \leq O$ (FIG. 5)

$$\frac{2R_2}{F_1}[F_1 - (V+U)] \leq D_2 \leq 2(R_1^2 - U^2)^{1/2}$$

For $O < U < (F_1 - V)$ (FIG. 4)
No cutting off of the beam is possible, so that for a given $F_1$ the minimum $D_2$ is determined by the left-hand side of the last equation, or by the power handling capability of the mirror, whichever is larger.

The reflective mirror surfaces are figured and lapped as required to provide the desired optical quality. In general, a fine finish on each mirror surface is desirable to reduce scattering and absorption of the incident beam.

Likewise, the curvature of the mirror elements will be dictated by acceptable optical practices. In the present system, reflective surfaces 78 is spherically curved, and the annular mirror reflective surface 142 is parabolically curved to reduce aberration and provide acceptable beam focusing.

It should also be noted, in keeping with accepted optical practices, that the mirror arrangement described herein provides an equal length optical path for all the portions of the beam, thereby maintaining the proper phase relationship of the beam.

As noted in the above analysis, a small displacement of the spherical mirror assembly 74 will result in a much larger displacement of the point of focus, $M_a$. This characteristic permits the mirror system 10 to be focused over a substantially wide range simply by adjusting a single element of the system 10. For applications requiring the focus to fall on a point outside the limits obtainable by simple adjustment, the spherical mirror assembly 74 may be easily replaced with an alternate, suitably curved element.

What is claimed is:

1. A mirror system for controlling a supply laser beam comprising a housing, an opening in said housing, a first mirror disposed at an angle with respect to said opening, said mirror having a flat reflective surface and positioned to reflect the supply laser beam passing through said opening substantially 90° from the direction of travel of the supply laser beam, said first mirror having an opening disposed centrally thereof;

a second mirror disposed forwardly of said first mirror and having a concave reflective surface and positioned to reflect the laser beam reflected from the reflective surface of the first mirror and defining an aperture through the reflective surface thereof, means for supporting said second mirror relative to said housing; a third mirror disposed within said first mirror opening and having a convex reflective surface positioned to convergingly reflect the laser beam reflected from the reflective surface of the second mirror outwardly through said aperture, independent means for adjusting each of said mirrors relative to one another to control the laser beam, said independent adjusting means for said first and third mirrors comprising a support ring fixedly disposed in said housing rearwardly of said mirrors, and defining a central opening, spaced adjusting locked screws positioned about said ring and engaging the back surface of said first mirror, for aadjusting the angle thereof, a second support ring, means supporting said second ring on said first ring concentrically thereof, said second support ring having an opening therein aligned rearwardly of said first mirror support opening, said third mirror having a body portion extending through said aligned openings, means securing said body portion to said second ring, a first set of lockable adjusting screw means positioned in said second ring and engaging said first ring for angularly and axially adjusting said third mirror, and a second set of adjusting screw means secured to said second ring for radially adjusting said third mirror, said independent adjusting means for said second mirror comprising a support for said mirror; adjustable screw means disposed about said third mirror support for connecting the same to said housing; a first set of adjusting screws dispposed on said third mirror support and engaging the rear surface thereof for angularly and axially adjusting said mirror with respect thereto and a second set of adjusting screw means radially disposed with respect to said support and said third mirror for radially adjusting the same.

* * * * *